(12) United States Patent
Lu et al.

(10) Patent No.: US 12,323,828 B2
(45) Date of Patent: Jun. 3, 2025

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 221 days.

(21) Appl. No.: 17/554,188

(22) Filed: Dec. 17, 2021

(65) Prior Publication Data

US 2022/0110010 A1    Apr. 7, 2022

Related U.S. Application Data

(63) Continuation of application No. PCT/CN2020/074367, filed on Feb. 5, 2020.

(30) Foreign Application Priority Data

Jun. 26, 2019  (WO) ............... PCT/CN2019/093129
Sep. 10, 2019  (WO) ............... PCT/CN2019/105177
Nov. 1, 2019   (WO) ............... PCT/CN2019/115155

(51) Int. Cl.
*H04W 76/34*   (2018.01)
*H04W 24/04*   (2009.01)

(52) U.S. Cl.
CPC ........... *H04W 24/04* (2013.01); *H04W 76/34* (2018.02)

(58) Field of Classification Search
CPC ..... H04W 24/04; H04W 76/34; H04W 76/14; H04W 76/19; H04W 36/0055; H04W 36/305; H04W 76/18; H04W 72/20; H04W 92/18
See application file for complete search history.

(56) References Cited

U.S. PATENT DOCUMENTS

| | | |
|---|---|---|
| 2008/0189360 A1 | 8/2008 | Kiley et al. |
| 2014/0017991 A1 | 1/2014 | Chang et al. |
| 2015/0334757 A1 | 11/2015 | Seo |

(Continued)

FOREIGN PATENT DOCUMENTS

| | | |
|---|---|---|
| CN | 104540159 A | 4/2015 |
| CN | 103037359 A | 5/2016 |

(Continued)

OTHER PUBLICATIONS

First Office Action issued in corresponding Indian application No. 202117058846, mailed Jun. 20, 2022.

(Continued)

*Primary Examiner* — Wei Zhao
(74) *Attorney, Agent, or Firm* — BAYES PLLC

(57) ABSTRACT

Embodiments of the present application provide a wireless communication method and a terminal device. The method includes: determining, by the first terminal device, that an abnormality has occurred on the sidelink between the first terminal device and the second terminal device; and responding to the abnormality of the sidelink by the first terminal device.

16 Claims, 3 Drawing Sheets

(56) References Cited

U.S. PATENT DOCUMENTS

| | | | |
|---|---|---|---|
| 2018/0054804 A1 | 2/2018 | Luo et al. | |
| 2018/0110074 A1* | 4/2018 | Akkarakaran | H04W 72/21 |
| 2018/0124656 A1 | 5/2018 | Park et al. | |
| 2018/0220282 A1 | 8/2018 | Stahlin et al. | |
| 2019/0014523 A1 | 1/2019 | Lei et al. | |
| 2020/0196374 A1* | 6/2020 | Lim | H04W 80/02 |
| 2020/0252989 A1* | 8/2020 | Chen | H04W 76/19 |
| 2022/0232669 A1* | 7/2022 | Yang | H04W 76/14 |

FOREIGN PATENT DOCUMENTS

| | | |
|---|---|---|
| CN | 105611642 A | 5/2016 |
| CN | 107771410 A | 3/2018 |
| CN | 108886781 A | 11/2018 |
| CN | 109309928 A | 2/2019 |
| CN | 109474937 A | 3/2019 |
| CN | 109565793 A | 4/2019 |
| CN | 109565833 A | 4/2019 |
| CN | 109644460 A | 4/2019 |
| WO | 2017138796 A1 | 8/2017 |

OTHER PUBLICATIONS

Extended European Search Report issued in corresponding European application No. 20831270.2, mailed Jun. 30, 2022.
Vivo, "Open issues for Sidelink link failure and release", R2-1905845 (revision of R2-1903638), 3GPP TSG-RAN WG2 Meeting #106 Reno, USA, May 13-17, 2019.
Lenovo et al., "Radio link maintenance for NR V2X unicast", R2-1901002, 3GPP TSG-RAN WG2 Meeting #105 Athens, Greece, Feb. 25-Mar. 1, 2019.
Oppo, "Discussion on RRM and RLM of unicast for V2X", R2-1900176, 3GPP TSG-RAN WG2 Meeting #105 Athens, Greece, Feb. 25-Mar. 1, 2019.
Huawei et al., "Considerations on RLM for NR V2X unicast", R2-1907419 (revision of R2-1904876), 3GPP TSG-RAN WG2 Meeting#106 Reno, USA, May 13-17, 2019.
First Office Action issued in corresponding Chinese application No. 202111436158.X, mailed Mar. 30, 2023.
Notice of Allowance issued in corresponding European application No. 20831270.2, mailed Apr. 11, 2023.
Second Office Action issued in corresponding Chinese application No. 202111436158.X, mailed Jun. 27, 2023.
LG Electronics Inc., "Introduction of 5G V2X with NR Sidelink", R2-1908299, 3GPP TSG-RAN WG2 Meeting #106 Reno, USA, May 13-17, 2019.
International Search Report issued in corresponding International Application No. PCT/CN2019/093129, mailed Feb. 1, 2020, 19 pages.
Written Opinion of the International Searching Authority issued in corresponding International Application No. PCT/CN2019/093129, mailed Feb. 1, 2020, 7 pages.
International Search Report issued in corresponding International Application No. PCT/CN2019/105177, mailed Mar. 26, 2020, 20 pages.
Written Opinion of the International Searching Authority issued in corresponding International Application No. PCT/CN2019/105177, mailed Mar. 26, 2020, 7 pages.
International Search Report issued in corresponding International Application No. PCT/CN2019/115155, mailed Mar. 26, 2020, 21 pages.
Written Opinion of the International Searching Authority issued in corresponding International Application No. PCT/CN2019/115155, mailed Mar. 26, 2020,7 pages.
International Search Report issued in corresponding International Application No. PCT/CN2020/074367, mailed Apr. 17, 2020, 23 pages.
Written Opinion of the International Searching Authority issued in corresponding International Application No. PCT/CN2020/074367, mailed Apr. 17, 2020, 9 pages.
"New SID: Study on NR V2X", Agenda Item: 9.1.5, Source: Vodafone, 3GPP TSG RAN Meeting #80, RP-181480, La Jolla, USA, Jun. 11-14, 2018, 5 pages.
First Office Action issued in corresponding Japanese application No. 2021-577175, mailed Nov. 24, 2023.
Extended European Search Report issued in corresponding European application No. 23192155.2, mailed Nov. 29, 2023.
Source: OPPO (rapporteur); Title: Summary of [105bis#32] PC5-RRC signalling 3GPP TSG-RAN WG2 Meeting #106 R2-1905585 Reno, US, May 13-May 17, 2019.
Source: Intel Corporation; Title: Details on S-RLF 3GPP TSG-RAN WG2 #87 R2-143186 Dresden, Germany, Aug. 18-22, 2014.
Source: MediaTek Inc.; Title: RLF in sidelink 3GPP TSG-RAN WG2 Meeting #106 R2-1906341 Reno, US, May 13-17, 2019.
Hearing Notice issued in corresponding Indian application No. 202117058846, mailed May 29, 2024.

* cited by examiner

WIRELESS COMMUNICATION METHOD AND TERMINAL DEVICE

CROSS-REFERENCE TO RELATED APPLICATION

This application is a continuation of International Application No. PCT/CN2020/074367, filed on Feb. 5, 2020, and claims priority to International Patent Application No. PCT/CN2019/093129 filed with China's State Intellectual Property Office on Jun. 26, 2019, titled "wireless communication method and terminal device", International Patent Application No. PCT/CN2019/105177 filed with China's State Intellectual Property Office on Sep. 10, 2019, titled "wireless communication method and terminal device", and International Patent Application No. PCT/CN2019/115155 filed with China's State Intellectual Property Office on Nov. 1, 2019, titled "wireless communication method and terminal device", which are incorporated herein by reference in entireties thereof.

TECHNICAL FIELD

Embodiments of the present application relate to the communication field, and more specifically, to a wireless communication method and a terminal device.

BACKGROUND

A terminal device (for example, a vehicle-mounted terminal) can perform terminal-to-terminal communication on the sidelink based on resources allocated by a network device.

SUMMARY

Embodiments of the present application provide a wireless communication method and a terminal device.

A first aspect provides a wireless communication method, including:

determining, by a first terminal device, that an abnormality has occurred on the sidelink between the first terminal device and a second terminal device; and responding to the abnormality of the sidelink by the first terminal device.

A second aspect provides a terminal device, which is used to execute the method described in the first aspect or various implementation manners thereof.

In particular, the terminal device includes functional modules for executing the method described in the first aspect or various implementation manners thereof.

A third aspect provides a terminal device including a processor and a memory. The memory is configured to store a computer program, and the processor is configured to call and run the computer program stored in the memory to execute the method described in the first aspect or various implementation manners thereof.

A fourth aspect provides a device for implementing the method in various implementation manners of the first aspect.

In particular, the device includes: a processor, configured to call and run a computer program from a memory, so that an apparatus installed with the device executes the method in various implementation manners of the first aspect.

A fifth aspect provides a computer-readable storage medium storing a computer program. The computer program enables a computer to execute the method in various implementation manners of the first aspect.

A sixth aspect provides a computer program product, which includes computer program instructions that cause a computer to execute the method in various implementation manners of the first aspect.

A seventh aspect provides a computer program that, when running on a computer, causes a computer to execute the method in various implementation manners of the first aspect.

DETAILED DESCRIPTION

Technical solutions in embodiments of the present application will be described below in conjunction with the drawings of the embodiments of the present application. Apparently, the described embodiments are a part of the embodiments of the present application, not all of the embodiments. With respect to the embodiments in this application, all other embodiments obtained by those ordinary skilled in the art without paying creative work shall fall within the protection scope of this application.

The embodiments of the present application can be applied to any communication framework from a terminal device to another terminal device, such as vehicle to vehicle (V2V), vehicle to everything (V2X), Device to Device (D2D) and the like.

The terminal in embodiments of the present application may be any device or apparatus configured with a physical layer and a media access control layer, and the terminal device may also be referred to as an access terminal, for example, user equipment (UE), a subscriber unit, a subscriber station, a mobile station, a rover station, a remote station, a remote terminal, a mobile device, a user terminal, a terminal, a wireless communication device, a user agent, or a user device, etc.

The access terminal can be a cellular phone, a cordless phone, a Session Initiation Protocol (SIP) phone, a wireless local loop (WLL) station, a personal digital linear processing (PDA), and a handheld device/computing device with wireless communication function or other linear processing devices connected to wireless modems, a vehicle-mounted device, a wearable device, etc. The embodiments of the present application take a vehicle-mounted terminal as an example for description, but it is not limited to this.

In some embodiments of the present application, the embodiments of the present application may be applicable to transmission mode 3 and transmission mode 4 defined in the 3rd Generation Partnership Project (3GPP) Rel-14.

Figure 1:
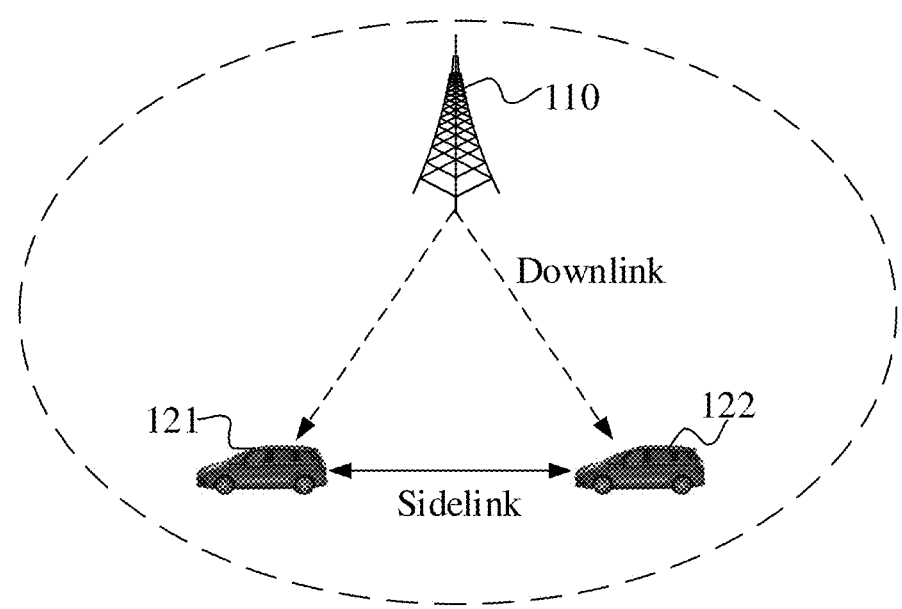
FIG. 1 is a schematic architecture diagram illustrating a transmission mode according to embodiments of the present application.
Figure 2:
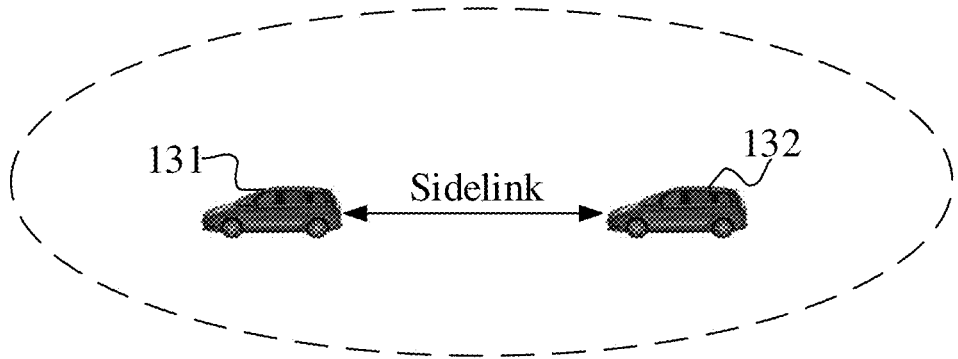
FIG. 2 is a schematic architecture diagram illustrating another transmission mode according to embodiments of the present application.

FIG. 1 is a schematic diagram illustrating Mode 3 of embodiments of the present application. FIG. 2 is a schematic diagram illustrating Mode 4 of embodiments of the present application.

In the transmission mode 3 shown in FIG. 1, transmission resources of vehicle-mounted terminals (vehicle-mounted terminal 121 and the vehicle-mounted terminal 122) are allocated by base station 110, and the vehicle-mounted terminals transmit data on the sidelink based on the resources allocated by the base station 110. Specifically, the base station 110 may allocate resources used for a single transmission to the terminals, and may also allocate resources for semi-static transmission to the terminals.

In the transmission mode 4 shown in FIG. 2, the vehicle-mounted terminals (vehicle-mounted terminal 131 and vehicle-mounted terminal 132) adopt a transmission mode of sensing and reservation, and the vehicle-mounted terminal independently selects resources among the sidelink transmission resources for data transmission.

The vehicle-mounted terminal 131 is described in detail as an example below.

The vehicle-mounted terminal 131 obtains a set of available transmission resources in a resource pool by sensing, and the vehicle-mounted terminal 131 randomly selects a transmission resource from the set for data transmission.

Since services in the Internet of Vehicles system have periodic characteristics, in the embodiments of the present application, the vehicle-mounted terminal 131 may also adopt a semi-static transmission mode. That is, after acquiring a transmission resource, the vehicle-mounted terminal 131 continuously uses the transmission resource in multiple transmission periods to reduce resource reselection and the probability of resource conflict.

The vehicle-mounted terminal 131 can carry information for reserving resources for the next transmission in the control information of current transmission, so that other terminals (for example, the vehicle-mounted terminal 132) can determine whether this resource is reserved and used by the user through detecting the control information of the user, thereby reducing resource conflicts.

The vehicle-mounted terminal involved in the embodiments of the present application may be applicable to scenarios with high data interaction efficiency, such as autopilot.

Figure 3:
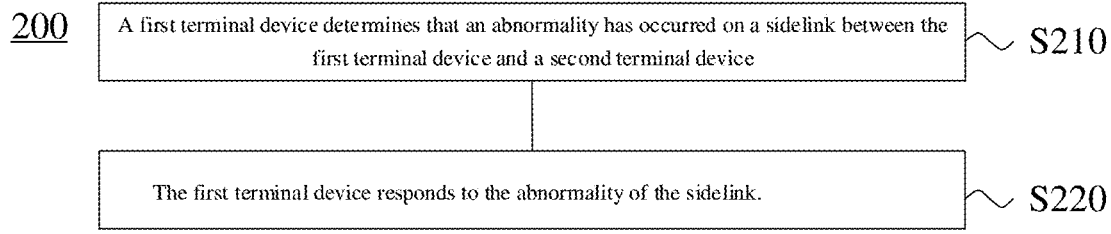
FIG. 3 is a schematic flowchart of a wireless communication method provided by embodiments of the present application.

FIG. 3 is a schematic flowchart of a wireless communication method 200 according to some embodiments of the present application. The method 200 may be executed by a first terminal device. The first terminal device shown in FIG. 3 may be the vehicle-mounted terminal shown in FIG. 1 or FIG. 2.

As shown in FIG. 3, the method 200 may include some or all of the following contents:

In S210, a first terminal device determines that an abnormality has occurred on the sidelink between the first terminal device and a second terminal device;

In S220, the first terminal device responds to the abnormality of the sidelink.

In some embodiments of the present application, the sidelink between the first terminal device and the second terminal device may be a unicast link, and the sidelink between the first terminal device and the second terminal device may also be one of multicast links.

Figure 4:
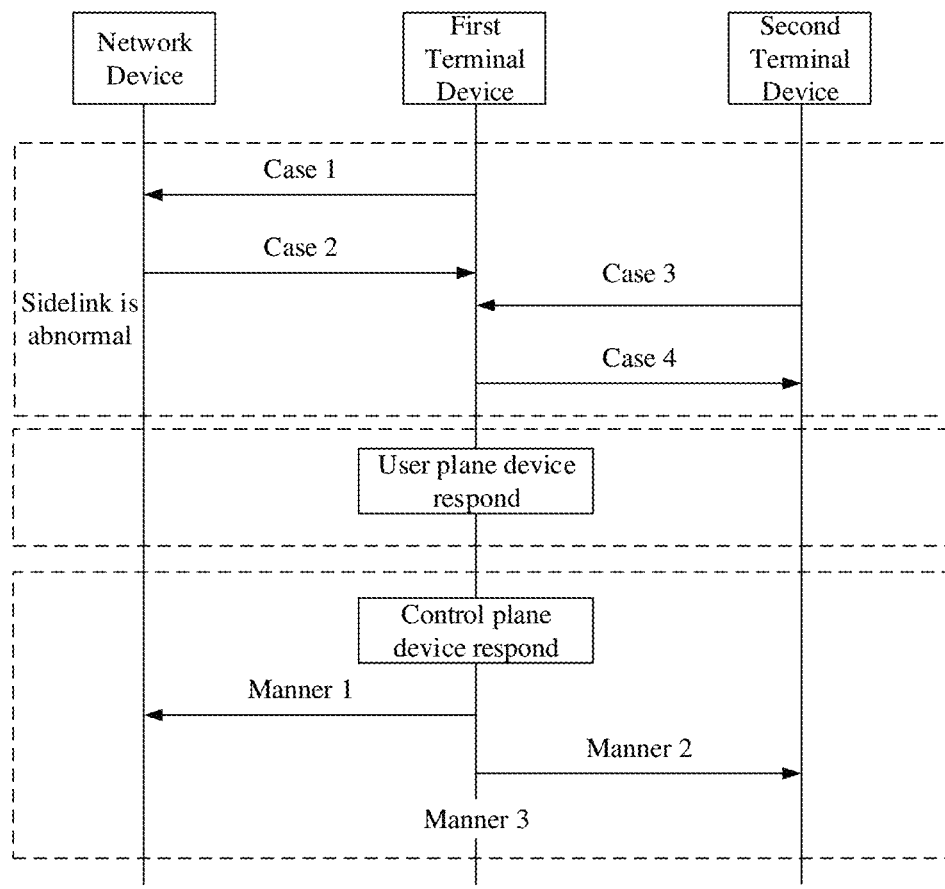
FIG. 4 is a schematic diagram illustrating a wireless communication method provided by embodiments of the present application.

In some embodiments of the present application, as shown in FIG. 4, in response to at least one of Cases 1 to 4 described below, the first terminal device may determine that an abnormality has occurred on the sidelink between the first terminal device and the second terminal device.

In Case 1, a first message with respect to the sidelink is transmitted to a network device by the first terminal device, and a first timer expires.

That is, when the first message with respect to the sidelink is transmitted to the network device by the first terminal device and the first timer expires, the first terminal device determines that an abnormality has occurred on the sidelink between the first terminal device and a second terminal device.

In some embodiments of the present application, the first timer is initiated when the first message is transmitted.

It should be noted that the first timer can also be initiated at some other moments as long as abnormality judgment requirement of the sidelink is met.

In some embodiments of the present application, the first timer is stopped when a second message is received.

It should be noted that a first duration is set for the first timer, after the first duration elapses since the timer is initiated, the first timer expires. The first terminal device senses the second message within the first duration. The first duration may be configured by the network device or pre-configured.

It should be understood that the second message may be a response message to the first message, or some other messages.

For example, the first message is a sidelink user equipment message (SidelinkUEInformation). For example, the second message is a radio resource control reconfiguration (RRCReconfiguration) message.

In Case 2, a third message transmitted from the network device is received by the first terminal device, and the third message indicates that an abnormality has occurred.

That is, when the third message transmitted from the network device is received by the first terminal device and the third message indicates that an abnormality has occurred, the first terminal device determines that an abnormality has occurred on the sidelink between the first terminal device and the second terminal device.

In some embodiments of the present application, the third message is a configuration message, and when the third message indicates that an abnormality has occurred, it may mean that the first terminal device cannot perform configuration according to part or all of the content of the third message. That is, the abnormality of the sidelink may be an abnormality caused by the first terminal device.

In some embodiments of the present application, the third message is a configuration message, and when the third message indicates that an abnormality has occurred, it may mean that: the network device has not provided corresponding parameter configuration for the communication link between the first terminal device and the second terminal device.

For example, the third message is the RRCReconfiguration message.

In Case 3, a fourth message transmitted from the second terminal device is received by the first terminal device, and the fourth message indicates that an abnormality has occurred.

That is, when the fourth message transmitted from the second terminal device is received by the first terminal device and the fourth message indicates that an abnormality has occurred, the first terminal device determines that an abnormality has occurred on the sidelink between the first terminal device and the second terminal device.

In some embodiments of the present application, the fourth message is a configuration message, and when the fourth message indicates that an abnormality has occurred, it may mean that the first terminal device cannot perform configuration according to part or all of the content of the fourth message. That is, the abnormality of the sidelink may be an abnormality caused by the first terminal device.

In some embodiments of the present application, the fourth message is a response message of the first configuration information transmitted to the second terminal device from the first terminal device. When the fourth message indicates that an abnormality has occurred, it may mean that: the second terminal device cannot perform configuration according to part or all of contents of the first configuration information. That is, the abnormality of the sidelink may be an abnormality caused by the second terminal device.

In Case 4, a fifth message is transmitted to the second terminal device by the first terminal device, and a second timer expires.

That is, when the fifth message is transmitted to the second terminal device by the first terminal device and the second timer expires, the first terminal device determines that an abnormality has occurred on the sidelink between the first terminal device and the second terminal device.

In some embodiments of the present application, the second timer is initiated when the fifth message is transmitted.

It should be noted that the second timer can also be initiated at some other moments as long as the abnormality judgment requirement of the sidelink is met.

In some embodiments of the present application, the second timer is stopped when a sixth message is received.

It should be noted that a second duration is set for the second timer, after the second duration elapses since the second timer is initiated, the second timer expires. The first terminal device senses the sixth message within the second duration. The second duration may be configured by the network device or pre-configured.

It should be understood that the sixth message may be a response message to the fifth message, or some other messages.

For example, the fifth message is an access layer configuration message, or the fifth message is a message for requesting capability information of the second terminal device. For example, the sixth message is an access layer configuration completion message, or the sixth message is a message used by the second terminal device for feeding back capability information.

In some embodiments of the present application, when the following Case 5 occurs, the first terminal device may determine that an abnormality has occurred on the sidelink between the first terminal device and the second terminal device.

In Case 5, a third timer expires.

That is, when the third timer expires, the first terminal device may determine that an abnormality has occurred on the sidelink between the first terminal device and the second terminal device.

In some embodiments of the present application, the first terminal device initiates the third timer according to at least one fourth indication information.

In other words, the first terminal device initiates the third timer according to a first quantity of fourth indication information.

In some embodiments of the present application, the first quantity may be agreed upon by a protocol, or the first quantity is determined by the first terminal device, or the first quantity is configured or instructed by the network device.

In some embodiments of the present application, the fourth indication information is defined according to a physical feedback channel. For example, if no Hybrid Automatic Repeat reQuest (HARD) feedback is received from the second terminal device, the bottom layer of the first terminal device triggers the generation of the fourth indication information and transfers the fourth indication information to the upper layer of the first terminal device.

In some embodiments of the present application, the first terminal device stops the third timer according to at least one fifth indication information.

In other words, the first terminal device stops the third timer according to a second quantity of the fifth indication information.

In some embodiments of the present application, the second quantity may be agreed upon by a protocol, or the second quantity is determined by the first terminal device, or the second quantity is configured or instructed by the network device.

In some embodiments of the present application, the fifth indication information is defined according to a physical feedback channel. For example, if the HARQ feedback from the second terminal device is received, the bottom layer of the first terminal device triggers the generation of the fifth indication information, and transfers the fifth indication information to the upper layer of the first terminal device.

It should be noted that the fourth indication information and fifth indication information are defined based on the HARQ feedback message and/or the feedback channel. For example, the fourth indication information or fifth indication information is defined according to the presence or absence of the HARQ feedback message.

As another example, the fourth indication information or the fifth indication information is defined according to the signal quality (SINR, RSRP, RSRQ, etc.) of the HARQ feedback message.

As yet another example, the fourth indication information or the fifth indication information is defined according to a combination of the presence or absence of the HARQ feedback message and the signal quality of the HARQ feedback message.

In some embodiments of the present application, the signal quality of the HARQ feedback message may include at least one of: signal to interference plus noise ratio (SINR), reference signal receiving power (RSRP), reference signal receiving quality (RSRQ).

Since the time-frequency resources used by the transmitting end device is unpredictable to the receiving end device, the receiving device cannot distinguish whether it fails to receive information transmitted from the transmitting end device on such time-frequency resource due to an abnormal link, or whether the receiving end device has not transmitted information on such time-frequency resource.

Therefore, in the above Case 5, since the resource location of the HARQ feedback message is known to both the transmitting end device (the first terminal device) and the receiving end device (the second terminal device), the problem of knowing no resources can be solved by restraining the third timer based on the HARQ feedback message, and it can also more conveniently determine whether the sidelink is abnormal.

In some embodiments of the present application, when the following Case 6 occurs, the first terminal device may determine that an abnormality has occurred on the sidelink between the first terminal device and the second terminal device.

In Case 6, a first counter reaches a first threshold.

That is, when the first counter reaches the first threshold, the first terminal device determines that an abnormality has occurred on the sidelink between the first terminal device and the second terminal device.

In some embodiments of the present application, the first terminal device modifies the first counter according to at least one sixth indication information.

The present embodiment is configured to use the sixth indication information that reaches a certain quantity (that is, the first threshold) to trigger the abnormality judgment of the sidelink. Specifically, when the sixth indication information reaches a certain quantity, the first counter reaches the first threshold, and the first terminal device may determine that an abnormality has occurred on the sidelink between the first terminal device and the second terminal device.

In some embodiments of the present application, the sixth indication information is defined according to a physical feedback channel.

In some embodiments of the present application, the method further includes the following step.

The first terminal device resets the first counter in response to the expiration of the fourth timer.

In specific implementation, the first counter can be reset when the fourth timer expires, so that the first counter restarts counting the sixth indication information. In this way, only relatively continuous pieces of sixth indication information are counted.

In some embodiments of the present application, the method further includes the following step.

The fourth timer is initiated or reinitiated by the first terminal device according to at least one seventh indication information.

Considering that the seventh indication information occurs at an uncertain time interval, the fourth timer is initiated or reinitiated every time the seventh indication information occurs to solve the problem that the interval between two adjacent seventh indication messages is too large.

If the interval between two pieces of adjacent seventh indication information is too large, the fourth timer will expire, which resets the first counter, that is, restarts counting the seventh indication information, so that only relatively continuous pieces of seventh indication information are counted. In this way, the object of triggering the abnormality of the sidelink due to relatively continuous counts, that is, a certain amount of seventh indication information is achieved.

In some embodiments of the present application, the seventh indication information is defined according to a physical feedback channel.

In some embodiments of the present application, the first terminal device may specifically respond to the abnormality of the sidelink from a user plane perspective and/or a control plane perspective.

That is, the first terminal device responds to the abnormality of the sidelink from the perspective of the user plane, and/or the first terminal device responds to the abnormality of the sidelink from the perspective of the control plane.

It should be noted that the order of the first terminal device's response to sidelink abnormality from the perspective of the user plane and the first terminal device's response to sidelink abnormality from the perspective of the control plane is not limited.

In some embodiments of the present application, as shown in FIG. 4, from the perspective of the user plane, the first terminal device may respond to the abnormality of the sidelink as follows:

suspending, releasing, resetting, or reestablishing a bearer of the sidelink; and/or suspending, releasing, resetting, or reestablishing a relevant entity of the bearer communicating through the sidelink.

In some embodiments of the present application, the bearer of the sidelink may be a signaling radio bearer (SRB) and/or a data radio bearer (DRB).

It should be noted that the bearer(s) of the sidelink may refer to individual bearer or all bearers. The relevant entity of the bearer communicating through the sidelink may be individual entity.

In some embodiments of the present application, the relevant entity of the bearers communicated through the sidelink includes at least one of: a service data adaptation protocol (SDAP) entity, a packet data convergence protocol (PDCP) entity, a radio link control protocol (RLC) entity, and a media access control (MAC) layer entity.

In some embodiments of the present application, from the perspective of the control plane, the first terminal device may respond to the abnormality of the sidelink in at least one of manners 1 to 3 described below, as shown in FIG. 4.

In Manner 1, the first terminal device transmits the first indication information to the network device, and the first indication information is used for indicating that the sidelink related to the first terminal device is abnormal.

In some embodiments of the present application, the first indication information includes at least one of: application layer identify (ID), layer 2 ID, source address, destination address, quality of service (QoS) attribute, channel quality information, frequency point information, provider service identifier (PSID) information, PC5 QoS flow identifier (PFI) information or bearer information.

In some embodiments of the present application, the first indication information includes at least one of: type information of the abnormality of the sidelink related to the first terminal device, application layer ID, layer 2 ID, source address, destination address, QoS attribute, channel quality information, frequency point information, PSID information, PFI information or bearer information.

It should be noted that the sidelink related to the first terminal device may be: part or all of the sidelink established with the first terminal device. For example, sidelink 1 is established between the first terminal device and the second terminal device, sidelink 2 is established between the first terminal device and the third terminal device, and sidelink 3 is established between the first terminal device and the fourth terminal device. Then, the sidelink related to the first terminal device may be sidelink 1, sidelink 2, and sidelink 3. Alternatively, the sidelink related to the first terminal device may also be only sidelink 1 or only sidelink 2 or only sidelink 3.

It should also be noted that the type information of the abnormality of the sidelink related to the first terminal device may refer to:

abnormalities on the sidelink related to the first terminal device occurred during different processes, for example, abnormality on the sidelink related to the first terminal device occurred during a capability transmission process, or abnormality on the sidelink related to the first terminal device occurred during an access layer configuration process;

abnormalities generated on the sidelink related to the first terminal device under different trigger conditions, for example, the abnormality generated on the sidelink related to the first terminal device when the timer expires, or the abnormality generated on the sidelink related to the first terminal device when error information (from the opposite terminal or from the network device) is displayed, or the abnormality generated on the sidelink related to the first terminal device when the link quality has a problem, such as a radio link failure (RLF);

abnormalities generated on the sidelink related to the first terminal device under different states, for example, the abnormality generated on the sidelink related to the first terminal device when the security configuration is activated or not, or the abnormality generated on the sidelink related to the first terminal device when the link connection is established or not.

In some embodiments of the present application, the type of the abnormality on the sidelink related to the first terminal device may be represented by a field, and different values in the field represent different types.

It should be noted that the above timer may be used to record the abnormality generated on the sidelink during the capability transmission process, or the above timer may be used to record the abnormality generated on the sidelink during the access layer configuration process.

In some embodiments of the present application, the timer may be pre-configured or agreed upon by the protocol, or configured by the network device.

In some embodiments of the present application, the first terminal device may also transmit the fourth indication information to the network device, and the fourth indication information is used for indicating that the link between the first terminal device and the network device is abnormal, or the first terminal device, the fourth indication information is used for indicating reestablishing the link between the first terminal device and the network device In Manner 2, the first terminal device transmits the second indication information to the second terminal device, and the second indication information is used for indicating that an abnormality has occurred on the sidelink related to the first terminal device, or the second indication information is used for indicating reestablishing the connection between the first terminal device and the second terminal device.

It should be noted that the second indication information can be used to indicate that the connection between the first terminal device and the second terminal device needs to be reestablished, can also be used to indicate that the first terminal device is configured to reestablish the connection between the first terminal device and the second terminal device, and can also be used to indicate that the second terminal device is configured to reestablish the connection between the first terminal device and the second terminal device.

In some embodiments of the present application, if the second indication information is used for indicating that an abnormality has occurred on the first terminal device, the second indication information includes at least one of: application layer ID, layer 2 ID, source address, destination address, QoS attribute, channel quality information, frequency point information, PSID information, PFI information or bearer information.

In some embodiments of the present application, if the second indication information is used for indicating that an abnormality has occurred on the first terminal device, the second indication information includes at least one of: the type information of the abnormality generated on the sidelink related to the first terminal device, application layer ID, layer 2 ID, source address, destination address, QoS attribute, channel quality information, frequency point information, PSID information, PFI information or bearer information.

In Manner 3, the first terminal device transmits the third indication information to a higher layer, and the third indication information is used for indicating that an abnormality has occurred on the first terminal device.

It should be noted that the upper layer may refer to the non-access layer.

In some embodiments of the present application, the third indication information includes at least one of: application layer ID, layer 2 ID, source address, destination address, QoS attribute, channel quality information, frequency point information, PSID information, PFI information, or bearer information.

In some embodiments of the present application, the third indication information includes at least one of: type information of the abnormality occurred on the sidelink related to the first terminal device, application layer ID, layer 2 ID, source address, destination address, and QoS attribute, channel quality information, frequency point information, PSID information, PFI information or bearer information.

In some embodiments of the present application, in Manners 1 to 3, the layer 2 ID may be transmitted in the access layer such as the MAC layer and the physical layer. The source address may be the address of the first terminal device, and the destination address may be the address of the second terminal device. The bearer information may include bearer type and/or bearer ID. The bearer type can be DRB and SRB.

In some embodiments of the present application, in Manners 1 to 3, the QoS attribute may include but is not limited to at least one of: PC5 5G QoS Indicator (PQI), data rate requirement, communication range, priority, delay requirements, packet error rate, maximum data burst volume.

It should be noted that, in FIG. 4, the network device is a network device serving the first terminal device.

Therefore, in the embodiments of the present application, in response to determining by the first terminal device that the sidelink between it and the second terminal device is abnormal, the first terminal device responds to the abnormality of the sidelink, thereby improving the communication performance on the sidelink.

Further, based on the above technical solutions, it is easy to establish a unified mechanism for handling sidelink abnormality.

Figure 5:
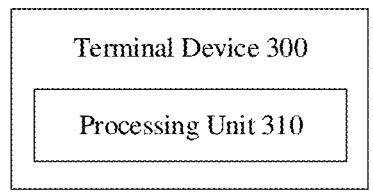
FIG. 5 is a schematic block diagram illustrating a terminal device provided by embodiments of the present application.

FIG. 5 is a schematic block diagram illustrating a terminal device 300 according to embodiments of the present application. As shown in FIG. 5, the terminal device 300 is the first terminal device, and includes:

a processing unit 310, configured to: determine that abnormality has occurred on the sidelink between the first terminal device and the second terminal device; and respond to the abnormality of the sidelink.

In some embodiments of the present application, the processing unit 310 is further configured to:

suspend, release, reset or re-establish a bearer of the sidelink; and/or, suspend, release, reset or reestablish a relevant entity of the bearer communicating through the sidelink.

In some embodiments of the present application, the relevant entity of the bearer communicating through the sidelink includes at least one of: a SDAP entity, a PDCP entity, a RLC entity, and a MAC layer entity.

In some embodiments of the present application, the terminal device 300 further includes: a communication unit 320, configured to transmit a first indication information to a network device, and the first indication information is used for indicating that abnormality has occurred on the sidelink related to the first terminal device.

In some embodiments of the present application, the first indication information includes at least one of: application layer ID, layer 2 ID, source address, destination address, QoS attribute, channel quality information, frequency point information, PSID information, PFI information, or bearer information.

In some embodiments of the present application, the first indication information includes at least one of: type information of the abnormality occurred on the sidelink related to the first terminal device, application layer ID, layer 2 ID, source address, destination address, QoS attribute, channel quality information, frequency point information, PSID information, PFI information or bearer information.

In some embodiments of the present application, the communication unit 320 is further configured to transmit a second indication information to the second terminal device, and the second indication information is used for indicating that abnormality has occurred on the sidelink related to the first terminal device. Alternatively, the second indication information is used for indicating reestablishment of a connection between the first terminal device and the second terminal device.

In some embodiments of the present application, if the second indication information is used for indicating that abnormality has occurred on the first terminal device, the second indication information includes at least one of: application layer ID, layer 2 ID, source address, destination address, QoS Attribute, channel quality information, frequency point information, PSID information, PFI information or bearer information.

In some embodiments of the present application, if the second indication information is used for indicating that abnormality has occurred on the first terminal device, the second indication information includes at least one of: the type information of the abnormality occurred on the sidelink related to the first terminal device, application layer ID, layer 2 ID, source address, destination address, QoS attribute, channel quality information, frequency point information, PSID information, PFI information or bearer information.

In some embodiments of the present application, the communication unit 320 is further configured to transmit a third indication information to a higher layer, and the third indication information is used for indicating that abnormality has occurred in the first terminal device.

In some embodiments of the present application, the third indication information includes at least one of: application layer ID, layer 2 ID, source address, destination address, QoS attribute, channel quality information, frequency point information, PSID information, PFI information, or bearer information.

In some embodiments of the present application, the third indication information includes at least one of: type information of the abnormality occurred on the sidelink related to the first terminal device, application layer ID, layer 2 ID, source address, destination address, QoS attribute, channel quality information, frequency point information, PSID information, PFI information or bearer information.

In some embodiments of the present application, the processing unit 310 is further configured to, in response to determining that the first terminal device transmits the first message with respect to the sidelink to the network device and the first timer expires, determine that abnormality has occurred on the sidelink between the first terminal device and the second terminal device.

In some embodiments of the present application, the first timer is initiated when a first message is transmitted.

In some embodiments of the present application, the first timer is stopped when a second message is received.

In some embodiments of the present application, the second message is an RRC reconfiguration message.

In some embodiments of the present application, the first message is the SidelinkUEInformation.

Optionally, the processing unit 310 is further configured to, in response to determining that the first terminal device receives a third message transmitted from the network device and/or the second terminal device and the third message indicates an abnormality has occurred, determine that an abnormality has occurred on the side link between the first terminal devices and the second terminal device.

In some embodiments of the present application, the third message is a configuration message, and when the third message indicates that an abnormality has occurred, it means that the first terminal device cannot perform configuration according to part or all of the content of the third message.

In some embodiments of the present application, the third message is a configuration message, and when the third message indicates that an abnormality has occurred, it may mean that: the network device has not provided corresponding parameter configuration for the communication link between the first terminal device and the second terminal device.

In some embodiments of the present application, the processing unit 310 is further configured to, in response to determining that the first terminal device receives a fourth message transmitted from the second terminal device and the fourth message indicates that an abnormality has occurred, determine that an abnormality has occurred on the sidelink between the first terminal devices and the second terminal device.

In some embodiments of the present application, the fourth message is a configuration message, and when the fourth message indicates that an abnormality has occurred, it means that the first terminal device cannot perform configuration according to part or all of the content of the fourth message.

In some embodiments of the present application, the fourth message is a response message of the first configuration information transmitted to the second terminal device from the first terminal device. When the fourth message indicates that an abnormality has occurred, it means that: the second terminal device cannot perform configuration according to part or all of contents of the first configuration information.

In some embodiments of the present application, the processing unit 310 is further configured to, in response to determining that the first terminal device transmits a fifth message to the second terminal device and the second timer expires, determine that an abnormality has occurred on the sidelink between the first terminal device and the second terminal device.

In some embodiments of the present application, the second timer is initiated when the fifth message is transmitted.

In some embodiments of the present application, the second timer is stopped when a sixth message is received.

In some embodiments of the present application, the sixth message is an access layer configuration complete message, or the sixth message is a message about feedback capability information of the second terminal device.

In some embodiments of the present application, the fifth message is an access layer configuration complete message, or the fifth message is a message for requesting capability information of the second terminal device.

In some embodiments of the present application, the processing unit 310 is further configured to:

when the third timer expires, determine that an abnormality has occurred on the sidelink between the first terminal device and the second terminal device.

In some embodiments of the present application, the processing unit 310 is further configured to start a third timer according to at least one fourth indication information.

In some embodiments of the present application, the fourth indication information is defined according to a physical feedback channel.

In some embodiments of the present application, the processing unit 310 is further configured to stop the third timer according to at least one fifth indication information.

In some embodiments of the present application, the fifth indication information is defined according to a physical feedback channel.

In some embodiments of the present application, the processing unit 310 is further configured to:

in response to a first counter reaching a first threshold, determine that an abnormality has occurred on the sidelink between the first terminal device and the second terminal device.

In some embodiments of the present application, the processing unit 310 is further configured to modify the first counter according to at least one sixth indication information.

In some embodiments of the present application, the sixth indication information is defined according to a physical feedback channel.

In some embodiments of the present application, the processing unit 310 is further configured to reset the first counter when the fourth timer expires.

In some embodiments of the present application, the processing unit 310 is further configured to initiate or reinitiate the fourth timer according to at least one seventh indication information.

In some embodiments of the present application, the seventh indication information is defined according to a physical feedback channel.

It should be understood that the terminal device 400 according to the embodiments of the present disclosure may correspond to the first terminal device in the method embodiments of the present disclosure, and the above and other operations and/or functions of each unit in the terminal device 400 are to implement the corresponding process of the first terminal device in the method 200 shown in FIG. 4, respectively. For the sake of brevity, it is not repeated here.

Figure 6:
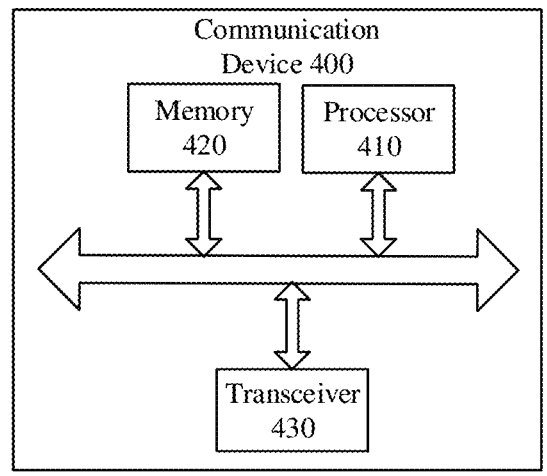
FIG. 6 is a schematic block diagram illustrating a communication device provided by embodiments of the present application.

FIG. 6 is a schematic structural diagram illustrating a communication device 400 provided by embodiments of the present disclosure. The communication device 400 shown in FIG. 6 includes a processor 410. The processor 410 may call a computer program from a memory and run the computer program to implement the method provided in the embodiments of the present disclosure.

In some embodiments of the present application, as shown in FIG. 6, the communication device 400 may further include a memory 420. The processor 410 may call the computer program from the memory 420 and run the computer program to implement the method provided in the embodiments of the present disclosure.

The memory 420 may be separated from the processor 410, or may be integrated into the processor 410.

In some embodiments of the present application, as shown in FIG. 6, the communication device 400 may further include a transceiver 430, and the processor 410 may control the transceiver 430 to communicate with other devices. Specifically, the transceiver 430 may transmit information or data to other devices, or receive information or data transmitted from other devices.

The transceiver 430 may include a transmitter and a receiver. The transceiver 430 may further include antennas, and the number of antennas may be one or more.

In some embodiments of the present application, the communication device 400 may be the network device of the embodiments of the present application, and may implement the corresponding process implemented by the network device in each method of the embodiments of the present application. For the sake of brevity, details are not repeated here.

In some embodiments of the present application, the communication device 400 may be the terminal device of the embodiments of the present application, and may implement the corresponding process implemented by the first terminal device in each method of the embodiments of the present application. For the sake of brevity, details are not repeated here.

Figure 7:
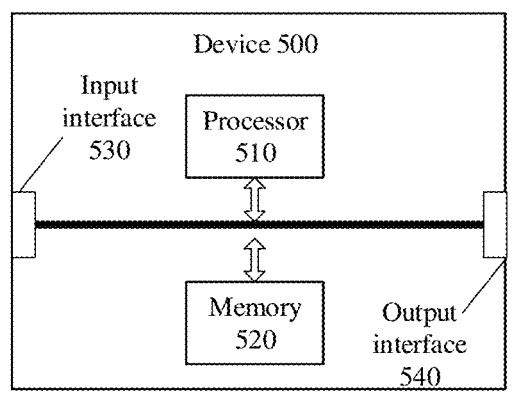
FIG. 7 is a schematic block diagram illustrating a device provided by embodiments of the present application.

FIG. 7 is a schematic structural diagram of an apparatus provided by an embodiment of the present disclosure. The apparatus 500 shown in FIG. 7 includes a processor 510. The processor 510 may call a computer program from a memory and run the computer program to implement the method provided in the embodiments of the present disclosure.

In some embodiments of the present application, as shown in FIG. 7, the apparatus 500 may further include a memory 520. The processor 510 may call the computer program from the memory 520 and run the computer program to implement the method provided in the embodiments of the present disclosure.

The memory 520 may be separated from the processor 510, or may be integrated into the processor 510.

Optionally, the apparatus 500 may further include an input interface 530. The processor 510 can control the input interface 530 to communicate with other devices or chips, and specifically, can obtain information or data transmitted from other devices or chips.

In some embodiments of the present application, the apparatus 500 may further include an output interface 540. The processor 510 can control the output interface 540 to communicate with other devices or chips, and specifically, can output information or data to other devices or chips.

In some embodiments of the present application, the apparatus may be applied to the network device in the embodiments of the present disclosure, and may implement the corresponding process implemented by the network device in each method of the embodiments of the present disclosure. For the sake of brevity, details are not repeated here.

In some embodiments of the present application, the apparatus may be applied to the terminal device in the embodiments of the present disclosure, and may implement the corresponding process implemented by the first terminal device in each method of the embodiments of the present disclosure. For the sake of brevity, details are not repeated here.

In some embodiments of the present application, the apparatus mentioned in the embodiments of the present application may also be a chip. For example, it can be a system-level chip, a system chip, a chip system, or a system-on-chip.

Figure 8:
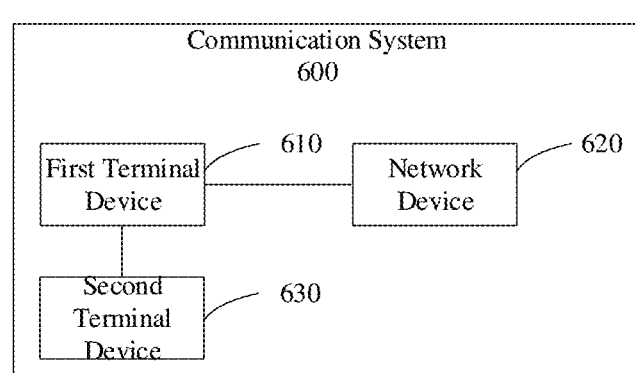
FIG. 8 is a schematic block diagram illustrating a communication system provided by embodiments of the present application.

FIG. 8 is a schematic block diagram illustrating a communication system 600 provided by embodiments of the present application. As shown in FIG. 8, the communication system 600 includes a first terminal device 610, a network device 620, and a second terminal device 630.

The first terminal device 610 may be used to implement the corresponding function implemented by the first terminal device in the foregoing method, and the network device 620 may be used to implement the corresponding function implemented by the network device in the foregoing method. The first terminal device 610 communicates with a second terminal device 630 through a sidelink. The second terminal device 630 can be used to implement the corresponding functions implemented by the second terminal device in the above method. For the sake of brevity, details are not repeated here.

It should be understood that the processor of the embodiments of the present disclosure may be an integrated circuit chip with signal processing capability. In the implementation process, the steps of the foregoing method embodiments can be performed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application can be directly executed by a hardware decoding processor, or executed by a combination of hardware and software modules in the decoding processor. The software module can be located in a mature storage medium in the field such as a random access memory, a flash memory, a read-only memory, a programmable read-only memory, or an electrically erasable programmable memory, registers. The storage medium is located in the memory, and the processor reads the information in the memory and completes the steps of the above method in combination with its hardware.

It should be understood that the memory in the embodiments of the present disclosure may be volatile memory or non-volatile memory, or may include both volatile and non-volatile memory. The non-volatile memory can be read-only memory (ROM), programmable read-only memory (PROM), erasable programmable read-only memory (EPROM), and Electrically Erasable programmable read-only memory (EEPROM) or flash memory. The volatile memory may be a random access memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these memories and any other suitable types of memories.

It should be understood that the above memories are exemplary rather than limitation. For example, the memory in the embodiments of the present disclosure may be a static RAM (SRAM), a dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM) and so on. In other words, the memories in the embodiments of the present disclosure are intended to include, but are not limited to, these memories and any other suitable types of memories.

The embodiments of the present disclosure further provide a computer readable storage medium for storing computer programs.

In some embodiments of the present application, the computer readable storage medium may be applied to the network device provided in the embodiments of the present disclosure, and the computer programs cause the computer to execute the corresponding process implemented by the network device in each method of the embodiments of the present disclosure. For brevity, details are not described herein again.

In some embodiments of the present application, the computer readable storage medium may be applied to the terminal device provided in the embodiments of the present disclosure, and the computer programs cause the computer to execute the corresponding process implemented by the first terminal device in each method of the embodiments of the present disclosure. For brevity, details are not described herein again.

The embodiments of the present disclosure further provide a computer program product including computer programe instructions.

In some embodiments of the present application, the computer program product may be applied to the network device provided in the embodiments of the present disclosure, and the computer program instructions cause the computer to execute the corresponding process implemented by the network device in each method of the embodiments of the present disclosure. For brevity, details are not described herein again.

In some embodiments of the present application, the computer program product may be applied to the terminal device provided in the embodiments of the present disclosure, and the computer program instructions cause the computer to execute the corresponding process implemented by the first terminal device in each method of the embodiments of the present disclosure. For brevity, details are not described herein again.

The embodiments of the present application further provide a computer program.

In some embodiments of the present application, the computer program may be applied to the network device provided in the embodiments of the present disclosure, and the computer program, when run on a computer, causes the computer to execute the corresponding process implemented by the network device in each method of the embodiments of the present disclosure. For brevity, details are not described herein again.

In some embodiments of the present application, the computer program may be applied to the terminal device provided in the embodiments of the present disclosure, and the computer program, when run on a computer, causes the computer to execute the corresponding process implemented by the first terminal device in each method of the embodiments of the present disclosure. For brevity, details are not described herein again.

Those ordinary skilled in the art may realize that the units and algorithm steps of the examples described in combination with the embodiments can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of this application.

Those skilled in the art can clearly understand that, for convenience and concise description, the specific working process of the above-described system, device, and units can refer to the corresponding process in the foregoing method embodiment, and details are not repeated herein.

In some embodiments provided in the present disclosure, it should be understood that the proposed system, device, and method may be implemented in other ways. For example, the device embodiments described above are merely illustrative. For example, the division of the units is only a logical function division, and there may be other divisions in actual implementation, for example, multiple units or components may be combined or It can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

If the function is implemented in the form of a software functional unit and sold or used as an independent product, it can be stored in a computer readable storage medium. In view of this, the part of the technical solution of this application in essence or that contributes to the prior art or the part of the technical solution can be embodied in the form of a software product, and the computer software product is stored in a storage medium. The storage medium includes several instructions so that a computer (which may be a personal computer, a server, or a network device, etc.) executes all or part of the steps of the methods described in the various embodiments of the present disclosure. The aforementioned storage medium includes: U disk, mobile hard disk drive, Read-Only Memory (ROM), Random Access Memory (RAM), magnetic disks or optical disks and other media that can store program codes.

The foregoing descriptions are merely exemplary implementations of the present disclosure, but the protection scope of the present disclosure is not limited thereto. Any changes or substitutions easily conceived by those skilled in the art based on the contents of the present disclosure fall within the protection scope of the present disclosure. Therefore, the protection scope of the present disclosure shall be defined by the appended claims.

What is claimed is:

1. A wireless communication method, comprising:
   determining, by a first terminal device, that a Radio Link Failure, RLF, has occurred on a sidelink between the first terminal device and a second terminal device; and
   in response to the RLF of the sidelink, resetting, by the first terminal device, a relevant entity of a bearer communicating through the sidelink,
   wherein the method further comprises:
   in response to the RLF of the sidelink, transmitting, by the first terminal device, a first indication information to a network device, wherein the first indication information is used for indicating that the RLF has occurred on the sidelink related to the first terminal device,
   wherein determining, by the first terminal device, that the RLF has occurred on the sidelink between the first terminal device and the second terminal device comprises:
   in response to the first terminal device having transmitted a fifth message to the second terminal device and a second timer expiring, determining, by the first terminal device, the RLF has occurred on the sidelink between the first terminal device and the second terminal device, and
   wherein the second timer is stopped when a sixth message is received, wherein the sixth message is an access layer configuration complete message.

2. The method according to claim 1, wherein the relevant entity of the bearer communicating through the sidelink comprises a media access control (MAC) layer entity.

3. The method according to claim 1, wherein the first indication information comprises at least one of:
   layer 2 ID, source address or destination address.

4. The method according to claim 1, wherein the first indication information comprises type information of the RLF occurred on the sidelink related to the first terminal device.

5. The method according to claim 1, further comprising:
   in response to the RLF of the sidelink, transmitting, by the first terminal device, a third indication information to a higher layer, wherein the third indication information is used for indicating that the RLF has occurred on the first terminal device.

6. The method according to claim 5, wherein the third indication information comprises destination address.

7. The method according to claim 1, wherein the second timer is initiated when the fifth message is transmitted, wherein the fifth message is an access layer configuration message.

8. The method according to claim 1, wherein determining, by the first terminal device, that the RLF has occurred on the sidelink between the first terminal device and the second terminal device comprises:
   in response to a first counter reaching a first threshold, determining by the first terminal device that the RLF has occurred on the sidelink between the first terminal device and the second terminal device.

9. The method according to claim 8, further comprising:
   modifying the first counter by the first terminal device according to at least one sixth indication information, wherein the sixth indication information is defined according to a physical feedback channel.

10. A terminal device, wherein the terminal device is a first terminal device, and comprises a processor and a memory for storing a computer program, wherein the processor is configured to call and run the computer program stored in the memory to perform operations of:

determining that a Radio Link Failure, RLF, has occurred on a sidelink between the first terminal device and a second terminal device; and in response to the RLF of the sidelink, resetting a relevant entity of a bearer communicating through the sidelink, wherein the processor is further configured to perform:

transmitting a first indication information to a network device, wherein the first indication information is used for indicating that the RLF has occurred on the sidelink related to the first terminal device, wherein the processor is further configured to perform:

in response to the first terminal device having transmitted a fifth message to the second terminal device and a second timer expiring, determining, by the first terminal device, the RLF has occurred on the sidelink between the first terminal device and the second terminal device, and wherein the second timer is stopped when a sixth message is received, wherein the sixth message is an access layer configuration complete message.

11. The terminal device according to claim 10, wherein the relevant entity of the bearer communicating through the sidelink comprises a media access control (MAC) layer entity.

12. The terminal device according to claim 10, wherein the first indication information comprises at least one of:

layer 2 ID, source address, destination address or type information of the RLF occurred on the sidelink related to the first terminal device.

13. The terminal device according to claim 10, wherein the processor is further configured to perform operations of:

transmitting a third indication information to a higher layer, wherein the third indication information is used for indicating that the RLF has occurred on the first terminal device.

14. The terminal device according to claim 13, wherein the third indication information comprises destination address.

15. The terminal device according to claim 10, wherein wherein the second timer is initiated when the fifth message is transmitted, and the fifth message is an access layer configuration message.

16. A non-transitory computer-readable storage medium for storing a computer program, wherein the computer program causes a computer to execute the following operations:

determining, by a first terminal device, that a Radio Link Failure, RLF, has occurred on a sidelink between the first terminal device and a second terminal device; and in response to the RLF of the sidelink, resetting, by the first terminal device, a relevant entity of a bearer communicating through the sidelink, wherein the computer is further caused to execute:

transmitting a first indication information to a network device, wherein the first indication information is used for indicating that the RLF has occurred on the sidelink related to the first terminal device, wherein determining, by the first terminal device, that the RLF has occurred on the sidelink between the first terminal device and the second terminal device comprises:

in response to the first terminal device having transmitted a fifth message to the second terminal device and a second timer expiring, determining, by the first terminal device, the RLF has occurred on the sidelink between the first terminal device and the second terminal device, and wherein the second timer is stopped when a sixth message is received, wherein the sixth message is an access layer configuration complete message.

* * * * *